(12) United States Patent
Cheng et al.

(10) Patent No.: US 9,904,617 B2
(45) Date of Patent: Feb. 27, 2018

(54) SYSTEM PARAMETER PROCESSING METHOD, DEVICE AND SYSTEM

(71) Applicant: China Construction Bank Corporation, Beijing (CN)

(72) Inventors: Yinqian Cheng, Beijing (CN); Meng Li, Beijing (CN); Dongxiao Li, Beijing (CN); Wei Xu, Beijing (CN); Xiaoyao Yang, Beijing (CN); Zhe Wang, Beijing (CN); Chao Guo, Beijing (CN); Wenpeng Gao, Beijing (CN)

(73) Assignee: China Construction Bank Corporation, Beijing (CN)

( * ) Notice: Subject to any disclaimer, the term of this patent is extended or adjusted under 35 U.S.C. 154(b) by 0 days.

(21) Appl. No.: 15/388,612

(22) Filed: Dec. 22, 2016

(65) Prior Publication Data

US 2017/0132122 A1 May 11, 2017

Related U.S. Application Data

(63) Continuation of application No. PCT/CN2015/098827, filed on Dec. 25, 2015.

(30) Foreign Application Priority Data

Nov. 11, 2015 (CN) .......................... 2015 1 0767324

(51) Int. Cl.
*G06F 11/36* (2006.01)
(52) U.S. Cl.
CPC ...... *G06F 11/3692* (2013.01); *G06F 11/3664* (2013.01); *G06F 11/3668* (2013.01)
(58) Field of Classification Search
CPC ............. G06F 11/3664; G06F 11/3668; G06F 11/3692
See application file for complete search history.

(56) References Cited

U.S. PATENT DOCUMENTS 9,164,874 B1  10/2015 Tomay
9,558,106 B1 *  1/2017 Moniz ................. G06F 11/3692
(Continued)

FOREIGN PATENT DOCUMENTS

CN    101135989    3/2008
CN    102254035    11/2011
(Continued)

OTHER PUBLICATIONS

Post et al., "Configuration Lifting: Verification meets Software Configuration," 2008, Proceedings of the 2008 23rd IEEE/ACM International Conference on Automated Software Engineering, pp. 347-350, downloaded from the Internet at <url>:http://delivery.acm.org.*

(Continued)

*Primary Examiner* — Thuy Dao
*Assistant Examiner* — Stephen Berman
(74) *Attorney, Agent, or Firm* — Fitch, Even, Tabin & Flannery LLP (57) ABSTRACT

The present disclosure discloses system parameter processing method, device and system. The method includes receiving a parameter processing instruction input by a user; responding to parameter processing sub-instruction to acquire a responding result; storing the responding result corresponding to parameter processing sub-instruction in a preset format; comparing the actual value of the parameter corresponding to the parameter identifier to be processed with the test value thereof respectively; and outputting a comparison result.

14 Claims, 4 Drawing Sheets

(56) References Cited

U.S. PATENT DOCUMENTS

| | | | | |
|---|---|---|---|---|
| 9,606,906 B1* | 3/2017 | Van Nostrand | ..... | G06F 11/3692 |
| 2012/0167050 A1* | 6/2012 | Wong | ................ | G06F 11/3664 717/124 |
| 2012/0266135 A1* | 10/2012 | Mansour | ............ | G06F 11/3648 717/124 |
| 2012/0291014 A1* | 11/2012 | Shrinivasan | ........ | G06F 11/3664 717/124 |
| 2013/0174126 A1* | 7/2013 | Belihomji | ........... | G06F 11/3668 717/127 |
| 2014/0281732 A1* | 9/2014 | Elias | .................. | G06F 11/3668 714/38.1 |
| 2016/0070641 A1* | 3/2016 | Printz | ................ | G06F 11/3692 717/124 |

FOREIGN PATENT DOCUMENTS

| | | |
|---|---|---|
| CN | 103577907 | 2/2014 |
| CN | 104461863 | 3/2015 |
| CN | 104536863 | 4/2015 |

OTHER PUBLICATIONS

Cohen et al., "Testing across configurations: implications for combinatorial testing," 2006, ACM SIGSOFT Software Engineering Notes, vol. 31 Issue 6, pp. 1-9, downloaded from the Internet at <url>: http://delivery.acm.org.*

Sopitkamol et al., "A method for evaluating the impact of software configuration parameters on e-commerce sites," 2005, Proceedings of the 5th international workshop on Software and performance, pp. 53-64, downloaded from the Internet at <url>:http://delivery.acm. org.*

The State Intellectual Property Office of People's Repulic of China, First Office Action and Search Report Issued in International Application No. 201510767324.2, dated Sep. 30, 2017, 10 pp.

International Search Report Issued in International Application No. PCT/CN2015/098827, dated Jul. 21, 2016, 2 pp.

* cited by examiner

SYSTEM PARAMETER PROCESSING METHOD, DEVICE AND SYSTEM

CROSS-REFERENCE TO RELATED APPLICATIONS

This application is a continuation of International Application No. PCT/CN2015/098827, filed on Dec. 25, 2015, which claims priority to Chinese Patent Application No. 201510767324.2, filed on Nov. 11, 2015, both of which are hereby incorporated by reference in their entireties.

FIELD

The present disclosure relates to the technical fields of data communication, particularly, to system parameter processing method, device and system.

BACKGROUND

Nowadays, with the rapid development of Internet finance, new Internet products in the field of finance emerge in endlessly. In order to make the products meet users' demands of function, performance and the like, developers tend to have to deploy applications on a complex system containing a plurality of servers. Meanwhile, software such as an operating system, a middleware and a database should be installed on the servers so as to make the application programs run.

In order to ensure the correct and stable running of the complex system, developers have to make a very well-rounded test on the complex system. A general method is to use the same amount of servers (hardware configurations may be different) to set up a set of testing environment, install essential software products such as the operating system, middleware and database on the testing environment, deploy the application programs, perform parameter configurations on these softwares, and then make the well-rounded test on the application programs. After the application programs pass the test, the above series of software is deployed to a production environment and the parameter configuration is performed, thereby ensuring the correct running thereof.

However, during the deployment to the production environment, it is inevitable that some parameters are wrongly configured. The vast majority of parameters in the production environment are required to have to be consistent with those in the testing environment. Once there is inconsistence in these parameters, the application programs maybe not run normally, causing the application programs which have been passed the strict tests in the testing environment to run wrongly in the production environment, even causing production accident(s). However, due to very high requirements on the information system in the field of finance, the tolerance to the production accident is very low. Therefore, there is an urgent need to provide a method for checking parameters, which avoids the inconsistency of the one parameter in the production environment and in the testing environment so as to lower the possibility of the production accident.

SUMMARY

In view of this, the present disclosure provides a system parameter processing method, device and system to avoid the inconsistency of the one parameter in the production environment and in the testing environment so as to lower the possibility of the production accident.

In order to achieve the above purpose, the present disclosure provides the following technical solutions.

A system parameter processing method includes:

receiving a parameter processing instruction input by a user, the parameter processing instruction containing therein one or more parameter processing sub-instructions each of which at least includes a production environment computer identifier to be processed, a testing environment computer identifier to be processed corresponding to the production environment computer identifier to be processed, and a parameter identifier to be processed corresponding to the production environment computer identifier to be processed;

responding to each parameter processing sub-instruction to acquire a responding result corresponding to the parameter processing sub-instruction, this process specifically including:

looking up a production environment computer to be processed corresponding to the production environment computer identifier to be processed contained in the parameter processing sub-instruction, and a testing environment computer to be processed corresponding to the testing environment computer identifier to be processed contained in the parameter processing sub-instruction; sending, to the production environment computer to be processed and the testing environment computer to be processed respectively, a parameter retrieve instruction in which the parameter identifier to be processed corresponding to the production environment computer identifier to be processed is contained; receiving a retrieve result fed back from the production environment computer to be processed and at least containing an actual value of a parameter corresponding to the parameter identifier to be processed; receiving a retrieve result fed back from the testing environment computer to be processed and at least including a test value of the parameter corresponding to the parameter identifier to be processed; and taking the production environment computer identifier to be processed, the testing environment computer identifier to be processed, the parameter identifier to be processed, the actual value of the parameter corresponding to the parameter identifier to be processed and the test value of the parameter corresponding to the parameter identifier to be processed as the responding result corresponding to the parameter processing sub-instruction;

storing the responding result corresponding to each parameter processing sub-instruction in a preset format;

comparing the actual value of the parameter corresponding to the parameter identifier to be processed in each responding result with the test value thereof respectively; and outputting a comparison result.

Optionally, the comparison result is the responding result where the actual value of the parameter is different from the test value thereof.

Optionally, the comparison result is all the responding results, wherein the responding result where the actual value of the parameter is different from the test value thereof is marked in a preset manner.

Optionally, the method further includes:

receiving a parameter value modifying instruction input by the user, the parameter modifying instruction containing therein the production environment computer identifier to be processed, a parameter identifier to be modified and a modified value.

Optionally, the parameter processing sub-instruction further comprises: an identifier of a file where the parameter corresponding to the parameter identifier to be processed is located.

Optionally, the process of the production environment computer to be processed acquiring the retrieve result is as follows:

looking up a file where the parameter corresponding to the parameter identifier to be processed is located by using the identifier of the file where the parameter corresponding to the parameter identifier to be processed is located; and acquiring, from the file, a parameter value of the parameter corresponding to the parameter identifier to be processed.

Optionally, the retrieve result further includes:

a name of the file where the parameter corresponding to the parameter identifier to be processed is located.

A system parameter processing device includes:

a processing instruction receiving module for receiving a parameter processing instruction input by a user, the parameter processing instruction containing therein one or more parameter processing sub-instructions each of which at least includes a production environment computer identifier to be processed, a testing environment computer identifier to be processed corresponding to the production environment computer identifier to be processed, and a parameter identifier to be processed corresponding to the production environment computer identifier to be processed;

a responding result acquiring module for responding to each parameter processing sub-instruction to obtain a responding result corresponding to the parameter processing sub-instruction, the responding result acquiring module including a computer looking up unit for looking up a production environment computer to be processed corresponding to the production environment computer identifier to be processed contained in the parameter processing sub-instruction, and a testing environment computer to be processed corresponding to the testing environment computer identifier to be processed contained in the parameter processing sub-instruction; a control instruction sending unit for sending, to the production environment computer to be processed and the testing environment computer to be processed respectively, a parameter retrieve instruction in which the parameter identifier to be processed corresponding to the production environment computer identifier to be processed is contained; a retrieve result receiving unit for receiving a retrieve result fed back from the production environment computer to be processed and at least containing an actual value of a parameter corresponding to the parameter identifier to be processed, receiving a retrieve result fed back from the testing environment computer to be processed and at least comprising a test value of the parameter corresponding to the parameter identifier to be processed, and taking the production environment computer identifier to be processed, the testing environment computer identifier to be processed, the parameter identifier to be processed, the actual value of the parameter corresponding to the parameter identifier to be processed and the test value of the parameter corresponding to the parameter identifier to be processed as the responding result corresponding to the parameter processing sub-instruction;

a storing module for storing the responding result corresponding to each parameter processing sub-instruction in a preset format;

a processing module for comparing the actual value of the parameter corresponding to the parameter identifier to be processed in each responding result with the test value thereof respectively; and an outputting module for outputting a comparison result.

Optionally, the device further includes:

a parameter value modifying instruction receiving module for receiving a parameter value modifying instruction input by the user, the parameter modifying instruction containing therein a parameter identifier to be modified and a modified value.

A system parameter processing system includes: a server, a testing environment computer group and a production environment testing computer group, the testing environment computer group containing therein at least one testing environment computer each of which connects with the server, the production environment testing computer group containing therein at least one production environment computer each of which connects with the server, wherein the production environment computer one-to-one corresponds to the testing environment computer, wherein:

the server receives a parameter processing instruction input by a user, the parameter processing instruction containing therein one or more parameter processing sub-instructions each of which at least includes a production environment computer identifier to be processed, a testing environment computer identifier to be processed corresponding to the production environment computer identifier to be processed, and a parameter identifier to be processed corresponding to the production environment computer identifier to be processed; responds to each parameter processing sub-instruction to obtain a responding result corresponding to the parameter processing sub-instruction by: looking up a production environment computer to be processed corresponding to the production environment computer identifier to be processed contained in the parameter processing sub-instruction and a testing environment computer to be processed corresponding to the testing environment computer identifier to be processed contained in the parameter processing sub-instruction, sending, to the production environment computer to be processed and the testing environment computer to be processed respectively a parameter retrieve instruction in which the parameter identifier to be processed corresponding to the production environment computer identifier to be processed is contained, receiving a retrieve result fed back from the production environment computer to be processed and at least containing an actual value of a parameter corresponding to the parameter identifier to be processed, receiving a retrieve result fed back from the testing environment computer to be processed and at least comprising a test value of the parameter corresponding to the parameter identifier to be processed, and taking the production environment computer identifier to be processed, the testing environment computer identifier to be processed, the parameter identifier to be processed, the actual value of the parameter corresponding to the parameter identifier to be processed and the test value of the parameter corresponding to the parameter identifier to be processed as the responding result corresponding to the parameter processing sub-instruction; stores the responding result corresponding to each parameter processing sub-instruction in a preset format; compares the actual value of the parameter corresponding to the parameter identifier to be processed in each responding result with the test value thereof respectively; and outputs a comparison result;

the production environment computer receives the parameter retrieve instruction sent by the server, looks up the actual value of the parameter corresponding to the parameter identifier to be processed, generates the retrieve result containing the actual value of the parameter and feeds it back to the server; and the testing environment computer receives the parameter retrieve instruction sent by the server, looks up the test value of the parameter corresponding to the parameter identifier to be processed, generates the retrieve result containing the test value of the parameter and feeds it back to the server.

It is known from the above technical solutions that the system parameter processing method disclosed by the embodiments of the present application may obtain the computer parameter under the production environment according to the users' needs, then compare the computer parameter with that under the testing environment corresponding to this computer, and output the comparison result. Therefore, the user may rapidly and accurately find the parameter with inconsistent settings so as for the user to modify the parameter under the production environment to be consistent with that under the testing environment, thereby avoiding the production accident.

BRIEF DESCRIPTION OF THE DRAWINGS

In order to more clearly explain the embodiments of the present disclosure or the technical solution of the prior art, the drawings to be used in the descriptions of the embodiments or the prior art are briefly introduced as follows. Obviously, the drawings in the following description are only some embodiments of the present invention, and the person skilled in the art may further obtain other drawings from these drawings without contributing any creative work.

DETAILED DESCRIPTION OF THE EMBODIMENTS

The technical solutions in the embodiments of the present disclosure will be clearly and completely described with reference to the drawings in the embodiments of the present disclosure. Obviously, the described embodiments are just parts of the embodiments of the present disclosure rather than all the embodiments. Based on the embodiments of the present disclosure, all the other embodiments obtained by the person skilled in the art without contributing any creative work fall within the protection scope of the present disclosure.

Figure 1:
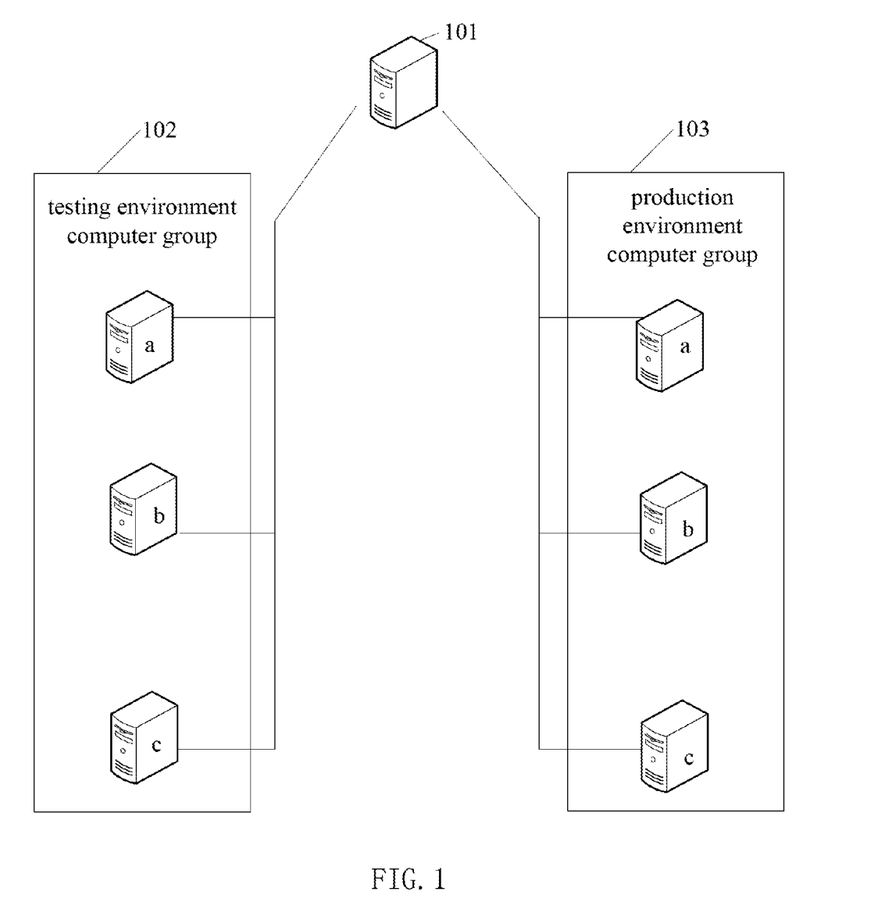
FIG. 1 is a structural schematic diagram of the system parameter processing system disclosed in the embodiments of the present disclosure.

In the present disclosure, the testing environment refers to a collective name of computer hardware, software, network device and historical data required to finish the software test. The production environment refers to an environment actually used when the application program is online and includes the computer hardware, software, network device and the like. The system parameter processing method disclosed in the present disclosure is applied to the system parameter processing system. As shown in FIG. 1, the system includes a server 101, a testing environment computer group 102 and a production environment testing computer group 103, where in the testing environment computer group 102 contains at least one testing environment computer each of which connects with the server 101, the production environment testing computer group 103 contains at least one production environment computer each of which connects with the server 101, and the production environment computers a, b and c one-to-one corresponds to the testing environment computers a, b and c respectively. The term "corresponds" refers to that the application program or operating system being tested in the computer under the testing environment is same as that running on the corresponding computer under the production environment.

Figure 2:
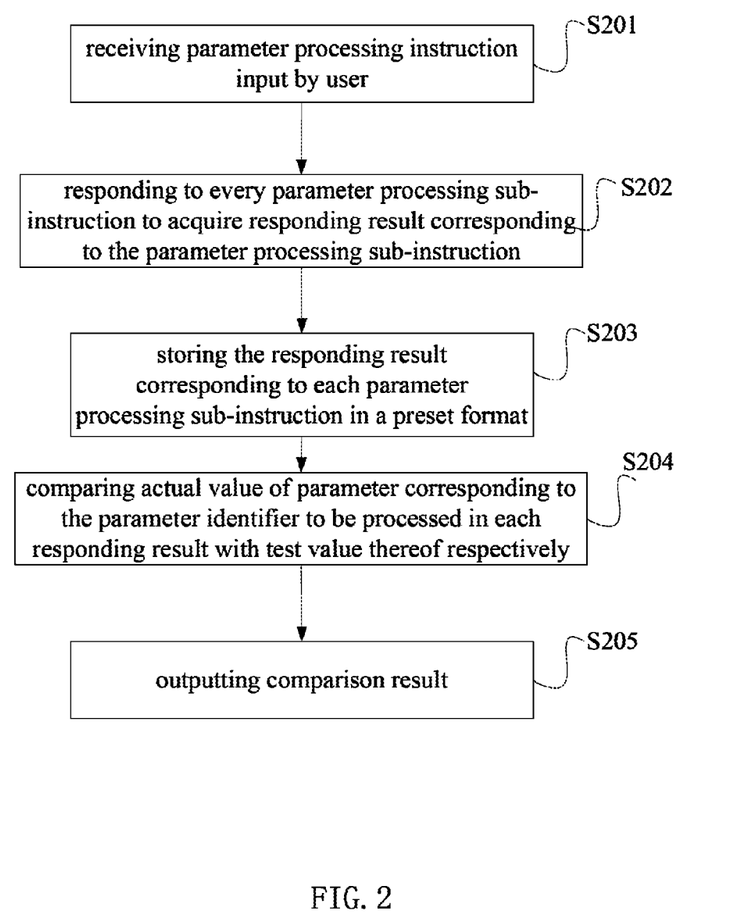
FIG. 2 is a flowchart of the system parameter processing method disclosed in the embodiments of the present disclosure.

The flow of the system parameter processing method disclosed in the embodiment is shown as FIG. 2. The method is applied to the computer system or the application program set on the computer which does not start to run, and the method includes the steps as follows.

Step S201: receiving a parameter processing instruction inputted by a user, wherein the parameter processing instruction includes one or more parameter processing sub-instructions therein; and the parameter processing sub-instruction at least contains: a production environment computer identifier to be processed, a testing environment computer identifier to be processed corresponding to the production environment computer identifier to be processed, and a parameter identifier to be processed corresponding to the production environment computer identifier to be processed.

When only one parameter in one computer needs to be processed, only one parameter processing sub-instruction needs to be included; when a plurality of parameters need to be processed, the parameter processing sub-instructions one-to-one corresponding to the parameters are necessary regardless of how many computers these parameters belong to.

The sub-processing instruction may be stored in the form of lists in which each entry records one parameter processing sub-instruction. Each entry contains therein the production environment computer identifier to be processed; the testing environment computer identifier to be processed corresponding to the production environment computer identifier to be processed; and the parameter identifier to be processed corresponding to the production environment computer identifier to be processed.

Alternatively, the processing sub-instruction may also be realized with three lists, that is, a production environment computer list, a testing environment computer list and a list of parameter to be processed. In different lists, the contents with the same number are one-to-one corresponding contents. For example, the first entry in the production environment computer list is the $2^{nd}$ production computer, whereas the first entry of the testing environment computer list is the $2^{nd}$ testing environment computer, and the list of parameter to be processed is the $3^{rd}$ parameter. It means that the sub-instruction is to process the $3^{rd}$ parameter in the $2^{nd}$ production environment computer and the $2^{nd}$ testing environment computer.

The parameters in the present disclosure are divided functionally, and may take the following as an example: operating system parameter, the operating system including Linux, HP-UX, AIX, Windows and the like; middleware parameter, the middleware including Apache, Tuxedo, Weblogic and the like; database parameter, the database including Oracle, MySQL, DB2, SQL Server and the like; application parameter, the application referring to an application program for processing a specific business, with different forms, but its parameter configuration tending to adopt the common formats of XML, key value pair and so on.

Step S202: responding to each parameter processing sub-instruction to acquire a responding result corresponding to the parameter processing sub-instruction.

Figure 3:
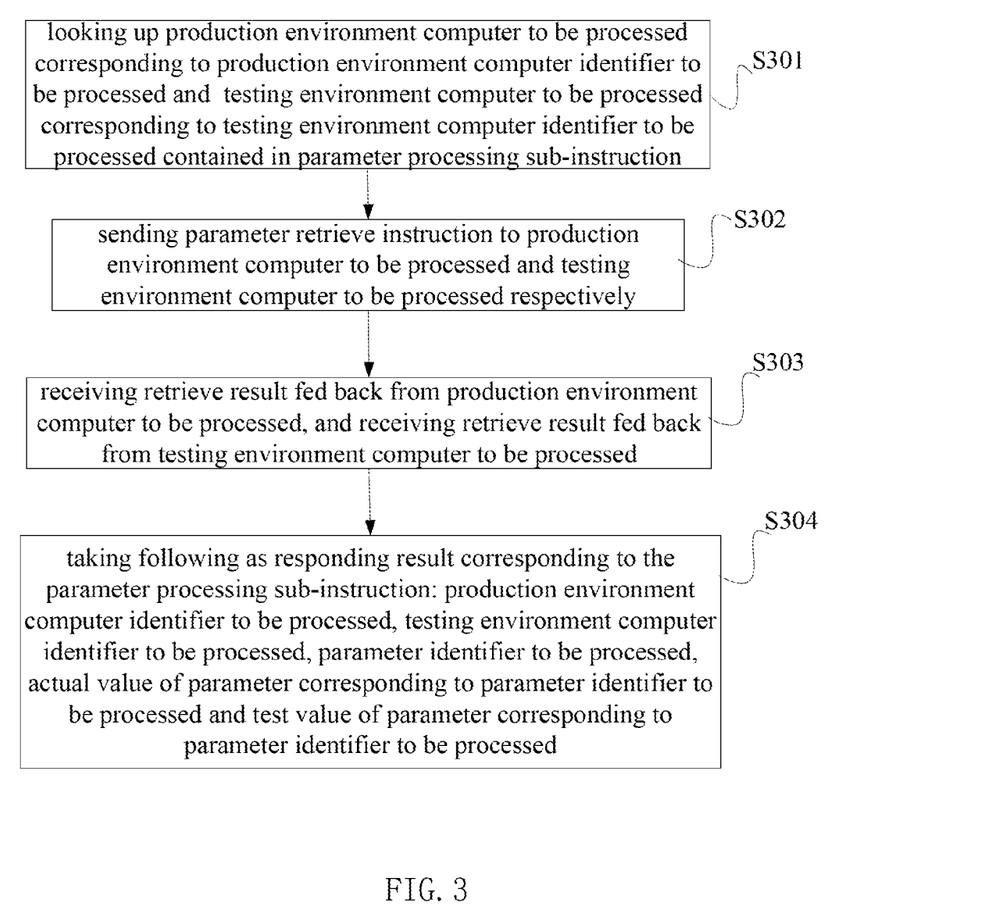
FIG. 3 is a flowchart of another system parameter processing method disclosed in the embodiments of the present disclosure.

The specific processing process of the step S202 is shown in FIG. 3 and includes:

step S301: looking up the production environment computer to be processed corresponding to the production environment computer identifier to be processed contained in the parameter processing sub-instruction, and the testing environment computer to be processed corresponding to the testing environment computer identifier to be processed contained in the parameter processing sub-instruction;

step S302: sending a parameter retrieve instruction to the production environment computer to be processed and the testing environment computer to be processed respectively, wherein the parameter retrieve instruction contains therein the parameter identifier to be processed corresponding to the production environment computer identifier to be processed;

step S303: receiving a retrieve result fed back from the production environment computer to be processed, wherein the retrieve result at least includes an actual value of the parameter corresponding to the parameter identifier to be processed; and receiving a retrieve result fed back from the testing environment computer to be processed, the retrieve result fed back from the testing environment computer to be processed at least includes a test value of the parameter corresponding to the parameter identifier to be processed;

wherein the received retrieve results may be in a form of lists, that is, the production environment computer to be processed stores all parameters retrieved by itself in a form of lists, and then feeds them back. Similarly, the testing environment computer to be processed also stores all parameters retrieved by itself in a form of lists, and then feeds them back;

step S304: taking the following as the responding result corresponding to the parameter processing sub-instruction: the production environment computer identifier to be processed, the testing environment computer identifier to be processed, the parameter identifier to be processed, the actual value of the parameter corresponding to the parameter identifier to be processed and the test value of the parameter corresponding to the parameter identifier to be processed.

The responding result of each parameter processing sub-instruction may be obtained by performing the above operation on the parameter processing sub-instruction.

Step S203: storing the responding result corresponding to each of the parameter processing sub-instructions in a preset format.

The test value of the parameter of the testing environment computer and the actual value of the parameter of the production environment computer are respectively stored in different lists, and the stored items are one-to-one corresponding in the different lists.

Step S204: comparing the actual value of the parameter corresponding to the parameter identifier to be processed with the corresponding test value thereof in each of the responding results respectively.

Step S205: outputting the comparison result.

In the present embodiments, the comparison result may be output in plural forms. Firstly, the responding result in which the actual value of the parameter is different from the test value thereof may be output as the comparison result.

As shown in the following list:

TABLE 1

| Computer name test/production | parameter identifier | testing computer parameter value (test value of parameter) | production computer parameter value (actual value of parameter) |
|---|---|---|---|
| Test1/Pro1 | Key1 | 3 | 5 |
| Test1/Pro1 | Key2 | abc | abcd |
| Test2/Pro2 | Key3 | 0.1 | 0.2 |

The user may directly find the parameters with different test and actual values, judge by himself/herself whether the difference of the parameter would cause the production problems, and determine whether to modify the value of the parameter.

Another form is to output all the responding results, and mark the responding result in which the actual value of the parameter is different from the test value thereof in a preset manner, such as displaying such responding result in a highlighting form, a enlarging font form, a bolding font form, or the like. All the manners capable of differentiating from the responding result in which the parameter actual value is the same as the parameter test value fall within the protection scope of the present embodiments Take the following list as an example:

TABLE 2

| computer name test/production | parameter identifier | testing computer parameter value (test value of parameter) | production computer parameter value (parameter actual value) |
|---|---|---|---|
| Test1/Pro1 | Key1 | 3 | 5 |
| Test1/Pro1 | Key2 | abc | abcd |
| Test2/Pro2 | Key3 | 0.1 | 0.2 |
| Test3/Pro3 | Key4 | 6 | 6 |
| Test3/Pro3 | Key5 | ab | ab |

In the table 2, the responding results in which the actual value of the parameter is different from the test value thereof are marked in the bolding form.

The system parameter processing method disclosed by the embodiments of the present disclosure may obtain the computer parameter under the production environment according to the users' needs, then compare it with the computer parameter under the testing environment corresponding to this computer, and output the comparison result. Therefore, the user may rapidly and accurately find the parameter with inconsistent settings so as for the user to modify the parameter under the production environment to be consistent with that under the testing environment, thereby avoiding the production accident.

Further, after the step S205, the method further includes:

step S206: receiving a parameter value modifying instruction input by a user, wherein the parameter modifying instruction contains therein the production environment computer identifier to be processed, the parameter identifier to be modified and a modified value.

After seeing the responding result, the user may definitely know which parameter on which computer is different from that in the testing environment, and modify the parameter thereof by the modifying instruction.

Further, the parameter processing sub-instruction may further include an identifier of a file where the parameter corresponding to the parameter identifier to be processed is located.

Figure 4:
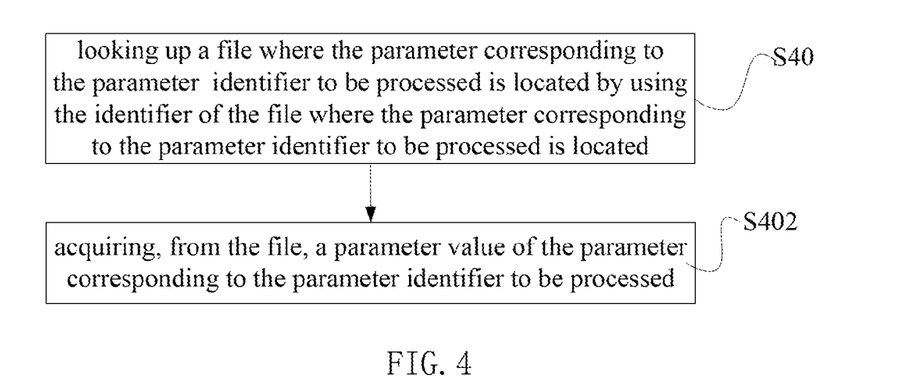
FIG. 4 is a flowchart of another system parameter processing method disclosed in the embodiments of the present disclosure.

The process of the production environment computer to be processed acquiring the retrieve result in the flow shown in FIG. 3 is further explained in FIG. 4, including:

step S401: looking up the file where the parameter corresponding to the parameter identifier to be processed is located by using the identifier of the file where the parameter corresponding to the parameter identifier to be processed is located; and step S402: acquiring, from the file, a parameter value of the parameter corresponding to the parameter identifier to be processed.

Since the file storing the parameter is known in advance, the file may be found firstly and then parameter is acquired during the acquiring process, which shortens, to some extent, the spent time from looking up the parameter to obtaining the value thereof, and further shortens the time of the whole processing process.

Similarly, the retrieve result may also include: a name of the file where the parameter corresponding to the parameter identifier to be processed is located.

The responding results may be output in a form as shown in the following list.

TABLE 3

| computer name test/ production | name of file where the parameter is located | parameter identifier | testing computer parameter value (test value of parameter) | production computer parameter value (actual value of parameter) |
|---|---|---|---|---|
| Test1/Pro1 | File1 | Key1 | 3 | 5 |
| Test1/Pro1 | File2 | Key2 | abc | abcd |
| Test2/Pro2 | File1 | Key3 | 0.1 | 0.2 |

The addition of the name of the file where the parameter is located is convenient for the user to subsequently modify the parameter, which may help the user find the parameter to be modified faster.

Figure 5:
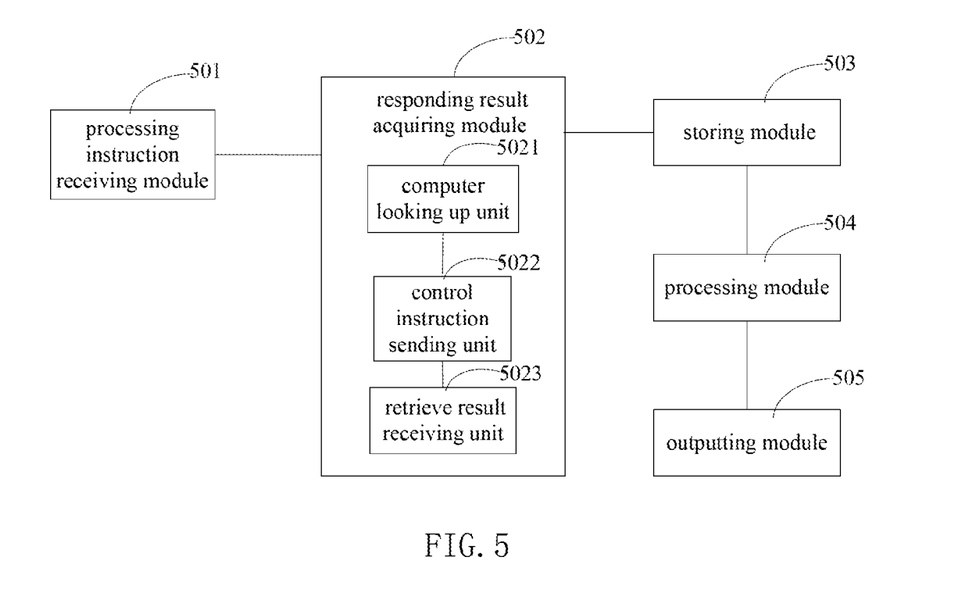
FIG. 5 is a structural schematic diagram of the system parameter processing device disclosed in the embodiments of the present disclosure.

The embodiments of the present disclosure also disclose a system parameter processing device, its structure shown in FIG. 5, including the following module.

A processing instruction receiving module 501 receives a parameter processing instruction input by the user, wherein the parameter processing instruction contains therein one or more parameter processing sub-instructions, and the parameter processing sub-instruction at least contains: the production environment computer identifier to be processed, the testing environment computer identifier to be processed corresponding to the production environment computer identifier to be processed, and the parameter identifier to be processed corresponding to the production environment computer identifier to be processed.

Firstly, before the device starts working, the user configures the one-to-one corresponding production environment computer and the testing environment computer.

Next, the parameter processing instruction input by the user is received, wherein the parameter processing sub-instruction in the parameter processing instruction corresponds to a certain parameter of a certain computer.

This processing sub-instruction may be realized by using three lists, that is, the production environment computer list, the testing environment computer list and the list of parameter to be processed. In different lists, the contents with the same number are one-to-one corresponding contents. For example, the first entry in the production environment computer list is the production computer 2, whereas the first entry of the testing environment computer list is the testing environment computer 2, and the first entry of the list of parameter to be processed is the parameter 3. It also means that this sub-instruction is to process the parameter 3 in the production environment computer 2 and the testing environment computer 2.

The responding result acquiring module 502 responds to every parameter processing sub-instruction to obtain the responding result corresponding to the parameter processing sub-instruction.

The responding result acquiring module includes:

a computer looking up unit 5021 for looking up the production environment computer to be processed corresponding to the production environment computer identifier to be processed contained in the parameter processing sub-instruction, and the testing environment computer to be processed corresponding to the testing environment computer identifier to be processed contained in the parameter processing sub-instruction; and a control instruction sending unit 5022 for sending the parameter retrieve instruction to the production environment computer to be processed and the testing environment computer to be processed respectively, wherein the parameter retrieve instruction contains therein the parameter identifier to be processed corresponding to the production environment computer identifier to be processed.

By the control instruction sending unit sending the parameter retrieve instruction to the testing environment computer to be processed and the production environment computer to be processed, the testing environment computer and the production environment computer are triggered to look up the parameters to be processed in the respective storing space.

A retrieve result receiving unit 5023 receives the retrieve result fed back from the production environment computer to be processed, which at least contains the actual value of the parameter corresponding to the parameter identifier to be processed; receives the retrieve result fed back from the testing environment computer to be processed, which at least includes the test value of the parameter corresponding to the parameter identifier to be processed; takes the production environment computer identifier to be processed, the testing environment computer identifier to be processed, the parameter identifier to be processed, the actual value of the parameter corresponding to the parameter identifier to be processed and the test value of the parameter corresponding to the parameter identifier to be processed as the responding result corresponding to the parameter processing sub-instruction.

The received retrieve results may be in a form of lists. That is, the production environment computer to be processed stores its retrieved all parameters in a form of lists, and then feeds them back to the retrieve result receiving unit. Similarly, the testing environment computer to be processed also stores its retrieved all parameters in a form of lists, and then feeds them back to the retrieve result receiving unit.

A storing module 503 stores the responding result corresponding to each of the parameter processing sub-instructions in a preset format.

The storing module stores the test values of the parameters of the testing environment computer and the actual values of the parameters of the production environment computer in different lists respectively, and the stored contents are one-to-one corresponding.

A processing module 504 compares the actual value of the parameter corresponding to the parameter identifier to be processed with the test value thereof respectively in each of the responding results.

A outputting module 505 outputs the comparison result.

The system parameter processing device disclosed by the embodiments of the present disclosure may obtain the computer parameter under the production environment according to the users' needs, then compare it with the computer parameter under the testing environment corresponding to this computer, and output the comparison result. Therefore, the user may rapidly and accurately find the parameter with inconsistent settings so as for the user to modify the parameter under the production environment to be consistent with that under the testing environment, thereby avoiding the production accident.

The present disclosure also discloses a system parameter processing device the structure of which, referring to FIG. 1, includes a server 101, the testing environment computer group 102 and the production environment testing computer group 103, wherein the testing environment computer group 102 contains therein at least one testing environment computer each of which connects with the server, the production environment testing computer group 103 contains therein at least one production environment computer each of which connects with the server 101, and the production environment computer one-to-one corresponds to the testing environment computer.

The server 101 receives the parameter processing instruction input by the user, wherein the parameter processing instruction includes therein one or more parameter processing sub-instructions each of which at least includes: the production environment computer identifier to be processed, the testing environment computer identifier to be processed corresponding to the production environment computer identifier to be processed, and the parameter identifier to be processed corresponding to the production environment computer identifier to be processed. The server 101 responds to each parameter processing sub-instruction to obtain the responding result corresponding to the parameter processing sub-instruction, wherein the above process includes: looking up the production environment computer to be processed corresponding to the production environment computer identifier to be processed contained in the parameter processing sub-instruction, and the testing environment computer to be processed corresponding to the testing environment computer identifier to be processed contained in the parameter processing sub-instruction; sending, to the production environment computer to be processed and the testing environment computer to be processed respectively, the parameter retrieve instruction in which the parameter identifier to be processed corresponding to the production environment computer identifier to be processed is contained; receiving the retrieve result fed back from the production environment computer to be processed and at least containing the actual value of the parameter corresponding to the parameter identifier to be processed; receiving the retrieve result fed back from the testing environment computer to be processed and at least including the test value of the parameter corresponding to the parameter identifier to be processed; and taking the following as the responding result corresponding to the parameter processing sub-instruction: the production environment computer identifier to be processed, the testing environment computer identifier to be processed, the parameter identifier to be processed, the actual value of the parameter corresponding to the parameter identifier to be processed and the test value of the parameter corresponding to the parameter identifier to be processed. The server 101 stores the responding result corresponding to each parameter processing sub-instruction in a preset format; compares the actual value of the parameter corresponding to the parameter identifier to be processed in each of responding results respectively with the test value thereof; and outputs the comparison result.

The production environment computer 103 receives the parameter retrieve instruction sent by the server, looks up the actual value of the parameter corresponding to the parameter identifier to be processed, generates the retrieve result containing the actual value of the parameter and feeds it back to the server.

The testing environment computer 102 receives the parameter retrieve instruction sent by the server, looks up the test value of the parameter corresponding to the parameter identifier to be processed, generates the retrieve result containing the test value of the parameter and feeds it back to the server.

The server in the present embodiments may be any one computer capable of communicating with other computers and realizing the above functions. As known by persons skilled in the art, the server may include a processor configured to execute the steps of the system parameter processing method disclosed in the present disclosure. Alternatively, the server may include a memory and a processor capable of carrying out the steps of the disclosed system parameter processing method of the present disclosure by executing the programs stored on the memory.

The system parameter processing system disclosed by the embodiments of the present disclosure may obtain the computer parameter under the production environment according to the users' needs, then compare it with the computer parameter under the testing environment corresponding to this computer, and output the comparison result. Therefore, the user may rapidly and accurately find the parameter with inconsistent settings so as for the user to modify the parameter under the production environment to be consistent with that under the testing environment, thereby avoiding the production accident.

It needs to explain that each embodiment of the present specification is described in a progressive manner, what focuses in each embodiment is the difference from that in other embodiments, and the same or similar parts between each embodiment may refer to each other. As for the embodiments of device type, due to being substantially similar to those of method type, the embodiments of device type are described briefly, and the relevant contents thereof may refer to the part of the embodiments of method type.

Finally, it further needs to explain that in the disclosure, the relation term, such as "first", "second" and so on, is only used for differentiating one entity or operation from another entity or operation, instead of necessarily requiring or implying that the entities or operations have such practical relation or order. Moreover, the terms "include(s)", "including", "contain(s)", "containing" or its other variants are intended to cover other non-exclusive inclusion, thereby making the process, method, article or device including a series of elements not only include the elements, but also further include other elements not listed explicitly, or further include elements inherent in such process, method, article or device. Without more limitations, the element defined by the sentence "including a . . . " does not exclude additional same element(s) existing in the process, method, article or device including the element.

The above explanation of the disclosed embodiments makes persons skilled in the art realize or use the present invention. Various modifications to the embodiments are obvious to persons skilled in the art. The general principles defined herein may be implemented in other embodiments without departing from the spirit or range of the present invention. Therefore, the present disclosure is not limited to the embodiments shown herein, but to cover the widest range in line with the principles and novelty characteristics disclosed herein.

The above is only the preferable embodiments of the present invention. It should point out that for persons skilled in the art, without departing from the principle of the present invention, some improvements and modifications may be made, and shall be considered as the protection scope of the present invention.

What is claimed is:

1. A system parameter processing method, comprising:
receiving a parameter processing instruction input by a user, the parameter processing instruction containing therein one or more parameter processing sub-instructions each of which at least comprises: a production environment computer identifier to be processed, a testing environment computer identifier to be processed corresponding to the production environment computer identifier to be processed, and a parameter identifier to be processed corresponding to the production environment computer identifier to be processed;
responding to each parameter processing sub-instruction to acquire a responding result corresponding to the parameter processing sub-instruction, this process comprising:
looking up a production environment computer to be processed corresponding to the production environment computer identifier to be processed contained in the parameter processing sub-instruction, and a testing environment computer to be processed corresponding to the testing environment computer identifier to be processed contained in the parameter processing sub-instruction;
sending, to the production environment computer to be processed and the testing environment computer to be processed respectively, a parameter retrieve instruction in which the parameter identifier to be processed corresponding to the production environment computer identifier to be processed;
receiving a retrieve result fed back from the production environment computer to be processed and at least containing an actual value of a parameter corresponding to the parameter identifier to be processed;
receiving a retrieve result fed back from the testing environment computer to be processed and at least comprising a test value of the parameter corresponding to the parameter identifier to be processed; and
taking the following as the responding result corresponding to the parameter processing sub-instruction: the production environment computer identifier to be processed, the testing environment computer identifier to be processed, the parameter identifier to be processed, the actual value of the parameter corresponding to the parameter identifier to be processed and the test value of the parameter corresponding to the parameter identifier to be processed;
storing the responding result corresponding to each parameter processing sub-instruction in a preset format;
comparing the actual value of the parameter corresponding to the parameter identifier to be processed in each responding result with the test value thereof respectively; and
outputting a comparison result.

2. The method according to claim 1, wherein the comparison result is the responding result in which the actual value of the parameter is different from the test value of the parameter.

3. The method according to claim 1, wherein the comparison result is all the responding results, wherein the responding result in which the actual value of the parameter is different from the test value thereof is marked in a preset manner.

4. The method according to claim 2, further comprising:
receiving a parameter value modifying instruction input by the user, the parameter modifying instruction containing therein the production environment computer identifier to be processed, a parameter identifier to be modified and a modified value.

5. The method according to claim 3, further comprising:
receiving a parameter value modifying instruction input by the user, the parameter modifying instruction containing therein the production environment computer identifier to be processed, a parameter identifier to be modified and a modified value.

6. The method according to claim 4, wherein the parameter processing sub-instruction further comprises: an identifier of a file where the parameter corresponding to the parameter identifier to be processed is located.

7. The method according to claim 5, wherein the parameter processing sub-instruction further comprises: an identifier of a file where the parameter corresponding to the parameter identifier to be processed is located.

8. The method according to claim 6, wherein the process of the production environment computer to be processed acquiring the retrieve result is as follows:
looking up a file where the parameter corresponding to the parameter identifier to be processed is located by using the identifier of the file where the parameter corresponding to the parameter identifier to be processed is located; and
acquiring, from the file, a parameter value of the parameter corresponding to the parameter identifier to be processed.

9. The method according to claim 7, wherein the process of the production environment computer to be processed acquiring the retrieve result is as follows:
looking up a file where the parameter corresponding to the parameter identifier to be processed is located by using the identifier of the file where the parameter corresponding to the parameter identifier to be processed is located; and
acquiring, from the file, a parameter value of the parameter corresponding to the parameter identifier to be processed.

10. The method according to claim 8, wherein the retrieve result further comprises:
a name of the file where the parameter corresponding to the parameter identifier to be processed is located.

11. The method according to claim 9, wherein the retrieve result further comprises:
a name of the file where the parameter corresponding to the parameter identifier to be processed is located.

12. A system parameter processing device comprising a hardware processor configured to:
receive a parameter processing instruction input by a user, the parameter processing instruction containing therein one or more parameter processing sub-instructions each of which at least comprises a production environment computer identifier to be processed, a testing environment computer identifier to be processed corresponding to the production environment computer identifier to be processed, and a parameter identifier to be processed corresponding to the production environment computer identifier to be processed;

respond to each parameter processing sub-instruction to obtain a responding result corresponding to the parameter processing sub-instruction, this process comprising:

looking up a production environment computer to be processed corresponding to the production environment computer identifier to be processed contained in the parameter processing sub-instruction, and a testing environment computer to be processed corresponding to the testing environment computer identifier to be processed contained in the parameter processing sub-instruction;

sending, to the production environment computer to be processed and the testing environment computer to be processed respectively, a parameter retrieve instruction in which the parameter identifier to be processed corresponding to the production environment computer identifier to be processed is contained;

receiving a retrieve result fed back from the production environment computer to be processed and at least containing an actual value of a parameter corresponding to the parameter identifier to be processed, receiving a retrieve result fed back from the testing environment computer to be processed and at least comprising a test value of the parameter corresponding to the parameter identifier to be processed, and taking the following as the responding result corresponding to the parameter processing sub-instruction: the production environment computer identifier to be processed, the testing environment computer identifier to be processed, the parameter identifier to be processed, the actual value of the parameter corresponding to the parameter identifier to be processed and the test value of the parameter corresponding to the parameter identifier to be processed;

store the responding result corresponding to each parameter processing sub-instruction in a preset format;

compare the actual value of the parameter corresponding to the parameter identifier to be processed in each responding result with the test value thereof respectively; and output a comparison result.

13. The device according to claim 12, wherein the processor is further configured to:

receive a parameter value modifying instruction input by the user, the parameter modifying instruction containing therein a parameter identifier to be modified and a modified value.

14. A system parameter processing system, comprising:

a server, a testing environment computer group and a production environment testing computer group, the testing environment computer group containing therein at least one testing environment computer having a hardware processor each of which connects with the server, the production environment testing computer group containing therein at least one production environment computer each of which connects with the server, wherein the production environment computer one-to-one corresponds to the testing environment computer, wherein the server receives a parameter processing instruction input by a user, the parameter processing instruction containing therein one or more parameter processing sub-instructions each of which at least comprises a production environment computer identifier to be processed, a testing environment computer identifier to be processed corresponding to the production environment computer identifier to be processed, and a parameter identifier to be processed corresponding to the production environment computer identifier to be processed;

the server responds to each parameter processing sub-instruction to obtain a responding result corresponding to the parameter processing sub-instruction by: looking up a production environment computer to be processed corresponding to the production environment computer identifier to be processed contained in the parameter processing sub-instruction and a testing environment computer to be processed corresponding to the testing environment computer identifier to be processed contained in the parameter processing sub-instruction, sending, to the production environment computer to be processed and the testing environment computer to be processed respectively, a parameter retrieve instruction, in which the parameter identifier to be processed corresponding to the production environment computer identifier to be processed is contained, receiving a retrieve result fed back from the production environment computer to be processed and at least containing an actual value of a parameter corresponding to the parameter identifier to be processed, receiving a retrieve result fed back from the testing environment computer to be processed and at least comprising a test value of the parameter corresponding to the parameter identifier to be processed, and taking the production environment computer identifier to be processed, the testing environment computer identifier to be processed, the parameter identifier to be processed, the actual value of the parameter corresponding to the parameter identifier to be processed and the test value of the parameter corresponding to the parameter identifier to be processed as the responding result corresponding to the parameter processing sub-instruction;

storing the responding result corresponding to each parameter processing sub-instruction in a preset format;

comparing the actual value of the parameter corresponding to the parameter identifier to be processed in each responding result with the test value thereof respectively; and outputting a comparison result;

the production environment computer receives the parameter retrieve instruction sent by the server, looks up the actual value of the parameter corresponding to the parameter identifier to be processed, generates the retrieve result containing the actual value of the parameter and feeds it back to the server; and the testing environment computer receives the parameter retrieve instruction sent by the server, looks up the test value of the parameter corresponding to the parameter identifier to be processed, generates the retrieve result containing the test value of the parameter and feeds it back to the server.

\* \* \* \* \*